US012264517B2

(12) United States Patent
Hermann

(10) Patent No.: US 12,264,517 B2
(45) Date of Patent: Apr. 1, 2025

(54) DOORJAMB SAFETY SYSTEM AND METHOD

(71) Applicant: Aexion Inc., Roseville, CA (US)

(72) Inventor: Ronald William Hermann, Roseville, CA (US)

(73) Assignee: Aexion Inc., Roseville, CA (US)

( * ) Notice: Subject to any disclaimer, the term of this patent is extended or adjusted under 35 U.S.C. 154(b) by 0 days.

(21) Appl. No.: 18/345,033

(22) Filed: Jun. 30, 2023

(65) Prior Publication Data

US 2023/0349208 A1 Nov. 2, 2023

Related U.S. Application Data

(63) Continuation of application No. 17/172,192, filed on Feb. 10, 2021, now Pat. No. 11,739,574.

(51) Int. Cl.

*E05C 17/00* (2006.01)
*E05C 17/54* (2006.01)
*E05F 5/04* (2006.01)

(52) U.S. Cl.

CPC ............ *E05C 17/025* (2013.01); *E05C 17/54* (2013.01); *E05F 5/04* (2013.01); *E05F 2005/046* (2013.01); *E05Y 2900/132* (2013.01)

(58) Field of Classification Search

CPC .......... E05C 17/025; E05C 17/54; E05F 5/04; E05F 2005/046; E05Y 2900/132

See application file for complete search history.

(56) References Cited

U.S. PATENT DOCUMENTS

| | | | |
|---|---|---|---|
| 2,680,593 A | 6/1954 | Mcintyre | |
| 3,423,044 A | 1/1969 | Beiderwell | |
| 3,865,329 A | 2/1975 | Higbee et al. | |
| 4,161,266 A | 7/1979 | Howarth, Jr. | |
| 4,588,046 A | 5/1986 | Van Der Neer et al. | |
| D298,214 S | 10/1988 | Adachi | |
| 4,831,688 A | 5/1989 | Deininger | |
| 4,877,110 A | 10/1989 | Wolner | |
| 5,027,471 A | 7/1991 | Barnes | |
| 5,042,613 A * | 8/1991 | Hermann | A62B 3/00 33/759 |
| 5,044,681 A | 9/1991 | Neighbors | |
| 5,173,067 A | 12/1992 | Biba | |
| 5,509,235 A | 4/1996 | Chander | |
| 5,511,837 A | 4/1996 | Dempsey et al. | |

(Continued)

*Primary Examiner* — Mark A Williams
(74) *Attorney, Agent, or Firm* — David Guerra

(57) ABSTRACT

A doorjamb safety system, device and method for utilization in holding open a door, and preferably an automatically closing door. The system can include a handle unit, a wedge unit slidably associated with handle unit, and a chock unit attachable with the handle unit and slidably associated with the edge unit. The chock unit includes a triangularly shaped chock and a shaft including multiple locking holes. The wedge unit includes a button that is engageable with the locking holes to lock the chock in a space apart relation with wedge sides of the wedge unit. The chock unit is rotatable allowing for insertion into a doorjamb, while the spacing between the chock and the wedge sides is adjustable to clamp a corner of a door frame and a door therebetween. The handle unit can include an electronic device such as a light.

19 Claims, 6 Drawing Sheets

(56) References Cited

U.S. PATENT DOCUMENTS

| | | | | | |
|---|---|---|---|---|---|
| 5,568,954 | A * | 10/1996 | Burgess | B25H 1/00 | 269/53 |
| 5,581,901 | A | 12/1996 | Takahashi | | |
| 5,680,675 | A | 10/1997 | Davis | | |
| 5,711,557 | A | 1/1998 | Nicolosi | | |
| 5,741,034 | A * | 4/1998 | Bains | E05C 17/56 | 292/338 |
| 5,920,997 | A | 7/1999 | Girtman | | |
| 6,003,911 | A | 12/1999 | Sowash | | |
| 6,182,789 | B1 | 2/2001 | Okamura | | |
| 6,317,047 | B1 | 11/2001 | Stein et al. | | |
| 6,557,915 | B1 * | 5/2003 | Duff | E05C 17/54 | 292/343 |
| 6,810,997 | B2 | 11/2004 | Schreiber et al. | | |
| 7,234,828 | B2 | 6/2007 | Kelly et al. | | |
| 7,478,851 | B2 * | 1/2009 | Geller | B25G 1/04 | 294/24 |
| 7,481,399 | B2 | 1/2009 | Nhren et al. | | |
| 8,413,763 | B2 * | 4/2013 | Hermann | A62B 3/00 | 182/231 |
| 8,960,739 | B2 | 2/2015 | Duff et al. | | |
| 9,127,489 | B2 | 9/2015 | Orlov et al. | | |
| 9,334,682 | B2 | 5/2016 | Kaplafka, Jr. | | |
| 9,546,507 | B2 | 1/2017 | Letson | | |
| 10,196,848 | B1 | 2/2019 | Fortmann | | |
| 10,273,729 | B2 | 4/2019 | Webster | | |
| 11,118,382 | B2 * | 9/2021 | File | E05C 17/025 | |
| 11,371,272 | B2 | 6/2022 | Pesacov et al. | | |
| 2002/0100244 | A1 | 8/2002 | Carroll | | |
| 2002/0158160 | A1 | 10/2002 | Shimizu | | |
| 2002/0180221 | A1 * | 12/2002 | Flowers | E05C 19/004 | 292/339 |
| 2004/0000095 | A1 * | 1/2004 | Smith | E06B 9/02 | 49/449 |
| 2004/0070218 | A1 * | 4/2004 | Smith | E05C 19/18 | 292/339 |
| 2005/0217937 | A1 | 10/2005 | Rohlf | | |
| 2007/0008719 | A1 | 1/2007 | Hill | | |
| 2007/0107329 | A1 | 5/2007 | Ferrara | | |
| 2007/0126248 | A1 | 6/2007 | Mintz | | |
| 2007/0186433 | A1 | 8/2007 | Campbell | | |
| 2010/0025157 | A1 | 2/2010 | Casebolt | | |
| 2010/0071265 | A1 | 3/2010 | Molnar et al. | | |
| 2010/0243783 | A1 * | 9/2010 | Hermann, II | A62B 3/00 | 242/379.2 |
| 2012/0227448 | A1 * | 9/2012 | Su | E05B 73/0005 | 70/58 |
| 2022/0251889 | A1 * | 8/2022 | Hermann | E05C 17/025 | |

* cited by examiner

DOORJAMB SAFETY SYSTEM AND METHOD

CROSS-REFERENCE TO RELATED APPLICATION

This application claims the benefit of priority of and is a continuation application under 35 U.S.C. § 120 based upon co-pending U.S. patent application Ser. No. 17/172,192, filed on Feb. 10, 2021. The entire disclosure of the prior application is incorporated herein by reference.

BACKGROUND

Technical Field

The present technology relates to a doorjamb safety or assist system and method for use in connection with holding a door open. More specifically, for holding a door open that has an automatic closer associated therewith, for exampling a door including spring hinges or an above spring arm attached to the door.

Background Description

During fire fighting operations it is often necessary to travel or search through a building or structure, for example, typically from a point of ingress and/or intended egress. These operations can include various duties, including fire suppression and/or searching for and rescuing individuals, which may be found therein. For example, a fire fighter may enter a room and move about through the smoke of that room in the performance of their duties. Upon attempting to egress that room, the limited visibility and conditions often make it very difficult for the individual to readily locate the point of ingress from which they entered the room. Rooms and the entire structure can be filled with large amounts of smoke. This is very dangerous to firefighters, who must exit burning buildings as quickly as possible when conditions become too dangerous to remain inside. In addition, doors through which the firefighters have entered a building may close, thus further obscuring the exit. As a result, fire fighters can be seriously injured or lose their lives attempting to locate the way back out of a room in a burning structure.

It can be extremely beneficial to keep doors open once a firefighter has entered or traveled through a doorway. Doing so would prevent the firefighter from being trapped in the room and could provide an indication as to which door the firefighter entered from.

Additional industries that benefit from keep doors open are, but not limited to, police and law enforcement, postal and delivery services, hotel hospitality or room cleaning services, entertainment venues such as concert halls, stadiums, theaters, etc.), places of worship, banquet halls, construction sites, and movers. Law enforcement can appreciate the benefit of keep doors open while executing search procedures throughout a building. Hotel hospitality can appreciate the benefit of keep a door open as they need to hold the doors open during housekeeping for insurance and/or liability reasons. The benefit for moving companies can easily be appreciated during operations of bringing materials into or out of a building or facility.

While the above-described devices fulfill their respective, particular objectives and requirements, the aforementioned devices or systems do not describe a doorjamb safety system and method that allows holding open an automatically closing door.

A need exists for a new and novel doorjamb safety system and method that can be used for holding open an automatically closing door. In this regard, the present technology substantially fulfills this need. In this respect, the doorjamb safety system and method according to the present technology substantially departs from the conventional concepts and designs of known devices, and in doing so provides an apparatus primarily developed for the purpose of holding open an automatically closing door.

SUMMARY

In view of the foregoing disadvantages inherent in the known types of door stops, jams or open retaining devices now present in the prior art, the present technology provides a novel doorjamb safety system and method, and overcomes one or more of the mentioned disadvantages and drawbacks of the prior art. As such, the general purpose of the present technology, which will be described subsequently in greater detail, is to provide a new and novel doorjamb safety system and method and method which has all the advantages of the prior art mentioned heretofore and many novel features that result in a doorjamb safety system and method which is not anticipated, rendered obvious, suggested, or even implied by the prior art, either alone or in any combination thereof.

According to one aspect, the present technology can provide a doorjamb safety system including a handle unit, a chock unit and a wedge unit. The handle unit can include a handle housing defining a handle hollow interior, and a shaft-receiving member located inside the handle hollow interior. The chock unit can include a shaft and a chock located at a first end of the shaft, a second end of the shaft being attachable to the shaft-receiving member. The shaft can include one or more holes defined therein. The wedge unit can include a body portion defining a body hollow interior, a wedge end, and a shaft-receiving bore defined through the wedge end and in communication with the body hollow interior. The body portion can be configured to slidably receive in the handle hollow interior. The shaft-receiving bore can be configured to slidably and rotatably receive the shaft. A lock button can be moveably associated with the wedge unit, and can be configured to be receivable in one of the holes of the shaft. A spring can be configured to provide a biasing force against the wedge unit when the handle housing is moved towards the wedge unit.

According to another aspect, the present technology can provide a doorjamb safety system including a handle unit, a chock unit and a wedge unit. The handle unit can include a handle housing defining a handle hollow interior, a shaft-receiving member located inside the handle hollow interior, and a second member located in the handle hollow interior. The second member can have a width or diameter greater than the shaft-receiving member. The shaft-receiving member can extend from the second member with a free end of the shaft-receiving member being located exterior of the handle housing. An end cap can be attached to an end of the handle housing, and can include a light. The chock unit can include a shaft and a chock located at a first end of the shaft. A second end of the shaft can be attachable to the shaft-receiving member. The shaft can include one or more holes defined therein. The wedge unit can include a body portion defining a body hollow interior, a wedge end including wedge sides that convergingly taper toward each other in a direction away from the body portion, and a shaft-receiving bore defined through the wedge end and in communication with the body hollow interior. The body portion can be configured to slidably receive in the handle hollow interior.

The shaft-receiving bore can be configured to slidably and rotatably receive the shaft. At least one pad can be attachable to each of the angled wedge sides. A spring can be configured to provide a biasing force against the wedge unit when the handle housing is moved towards the wedge unit.

According to yet another aspect, the present technology can include a method of using a doorjamb safety system that can include the steps of inserting a chock of a chock unit into a doorjamb so that the chock is located behind a door frame and door with a wedge end of a wedge unit located in front of the door frame and door. Then rotating the chock so that angled chock sides are facing a backside of the doorframe and the door, respectively. Positioning angled wedge sides of the wedge unit to face a front side of the doorframe and the door, respectively. Pushing a handle unit that is slidably associated with the wedge unit toward the wedge unit to compress a spring located in a handle housing of the handle unit and a body portion of the wedge unit to force the angled wedge sides to contact the front side of the doorframe and the door, respectively. Activating a lock button associated with the wedge unit to engage with a hole defined in a shaft of the chock unit, where the shaft is slidably through a shaft-receiving bore defined through the wedge unit.

In some or all embodiments, the handle unit can include an electronic device associated in an end cap attachable to the handle housing.

In some or all embodiments, the electronic device can be any one or any combination selected from the group consisting a light, an audible device, a radio receiver, a transmitter, a transceiver, and a tether.

In some or all embodiments, the handle unit can include a second member located in the handle hollow interior. The second member can have a width or diameter greater than the shaft-receiving member, and where the shaft-receiving member can extend from the second member with a free end of the shaft-receiving member being located exterior of the handle housing.

In some or all embodiments, the wedge unit can include a shaft-receiving member extending from the wedge end into the body hollow interior. The shaft-receiving member can be configured to separate the shaft-receiving bore and the body hollow interior.

In some or all embodiments, the spring can be locatable in the body hollow interior between the body portion and the shaft-receiving member and the handle hollow interior between the handle housing and the second member.

In some or all embodiments, the handle housing can include an inner surface that defines the handle hollow interior. The inner surface can convergingly taper toward the second member to create a narrowed section of the handle hollow interior with respect to an open end of the handle housing.

In some or all embodiments, the narrowed section of the handle hollow interior can be configured to press against a section of the body portion of the wedge unit at a predetermined insertion distance of the body portion inserting into the handle hollow interior.

In some or all embodiments, the wedge unit further can include a first channel and a second channel defined along a longitudinal axis of the wedge unit. The first and second channels can be in communication with the shaft-receiving bore.

In some or all embodiments, the wedge unit can include a ridge extending into the shaft-receiving bore to separate and define the first and second channels, and to define a transition opening configured to provide communication between the first channel, the second channel and the shaft-receiving bore.

In some or all embodiments, the wedge unit can include angled wedge sides that convergingly taper toward each other in a direction away from the body portion.

In some or all embodiments, the angled wedge sides can be spaced apart from each other to form an opening configured to receive at least a portion of the chock therebetween.

In some or all embodiments, the present technology can include at least one pad attachable to each of the angled wedge sides.

In some or all embodiments, the chock can include angled chock sides that are spaced apart from each other and are angled toward each other in a direction toward the shaft.

In some or all embodiments, a first pair of the angled wedge sides and the angled chock sides can be configured to receive a corner of a door frame therebetween, and a second pair of the angled wedge sides and the angled chock sides is configured to receive a corner of a door therebetween.

In some or all embodiments, the spring can be configured to push the wedge unit toward the door frame and the door so the angled wedge sides contact the door frame and the door respectively, pull the chock unit toward the door frame and door so the angled chock sides contacts the door frame and the door, respectively, or push the wedge unit and pull the chock unit toward the door frame and the door, respectively.

In some or all embodiments, the wedge unit can include a button spring configured to act on a portion of the lock button.

In some or all embodiments, the wedge unit can include a button housing extending from the body portion. The button housing can define a button hollow interior configured to receive the button spring. The button housing can define a first button bore configured to slidably receive a first portion of the lock button. The body portion can define a second button bore configured to slidably receive a second portion of the lock button, where the first portion of the lock button has a width or diameter greater than the second portion.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel doorjamb safety system and method that has all of the advantages of the prior art doorstops, jams or open retaining devices and none of the disadvantages.

It is another object of the present technology to provide a new and novel doorjamb safety system and method that may be easily and efficiently manufactured and marketed.

An even further object of the present technology is to provide a new and novel doorjamb safety system and method that has a low cost of manufacture with regard to both materials and labor, and which accordingly is then susceptible of low prices of sale to the consuming public, thereby making such doorjamb safety system and method economically available to the buying public.

Still another object of the present technology is to provide a new doorjamb safety system and method that provides in the apparatuses and methods of the prior art some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

BRIEF DESCRIPTION OF THE DRAWINGS

The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE EMBODIMENTS

Figure 1:
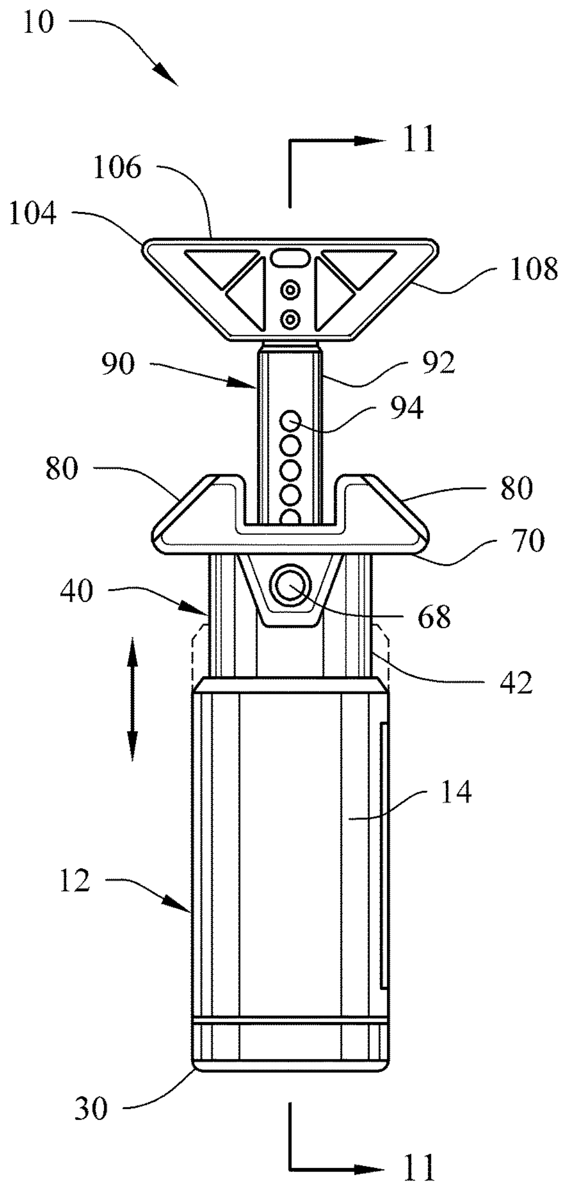
FIG. 1 is a front plane view of an embodiment of the doorjamb safety system constructed in accordance with the principles of the present technology, with the phantom lines depicting environmental structure and forming no part of the claimed present technology.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

Referring now to the drawings, and particularly to FIGS. 1-14, an embodiment of the doorjamb safety system and method of the present technology is shown and generally designated by the reference numeral 10.

In FIG. 1, a new and novel doorjamb safety system 10 of the present technology for holding open an automatically closing door is illustrated and will be described. More particularly, the doorjamb safety system 10 has a handle unit 12, a wedge unit 40 and a spring loaded triangled chock unit 90. In operation, these units can provide a compact device that can easily be inserted into a doorjamb between a doorframe and a door to secure the door in an open configuration and preventing the door from closing. It particularly, the doorjamb safety system 10 can be utilized to prevent an automatically closing door from closing, where the door includes an automatic closing mechanism such as, but not limited to, spring hinges or a above spring arm attached to the door.

Figure 2:
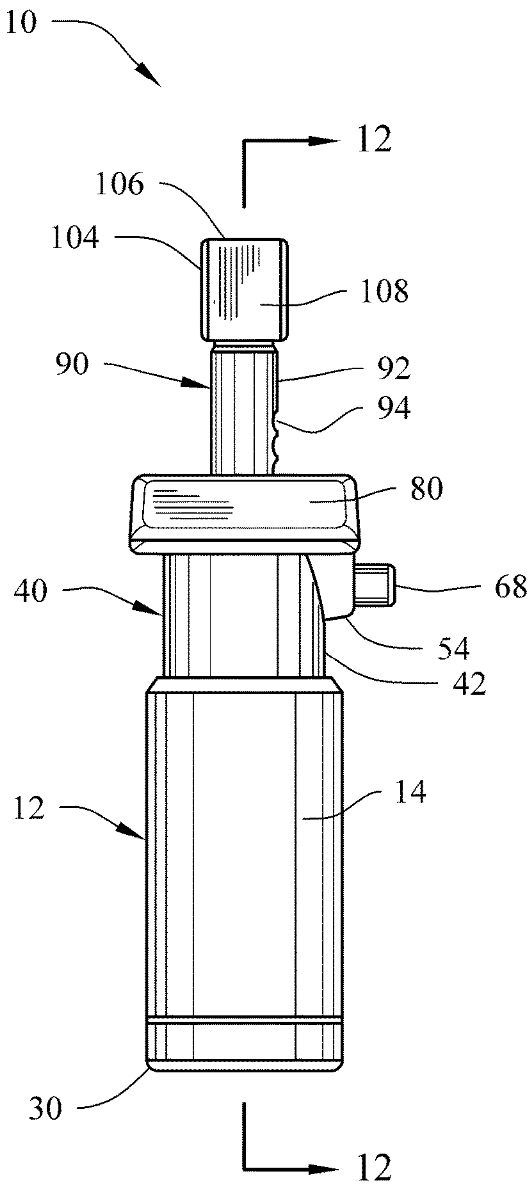
FIG. 2 is a left side view of the doorjamb safety system of the present technology.
Figure 3:
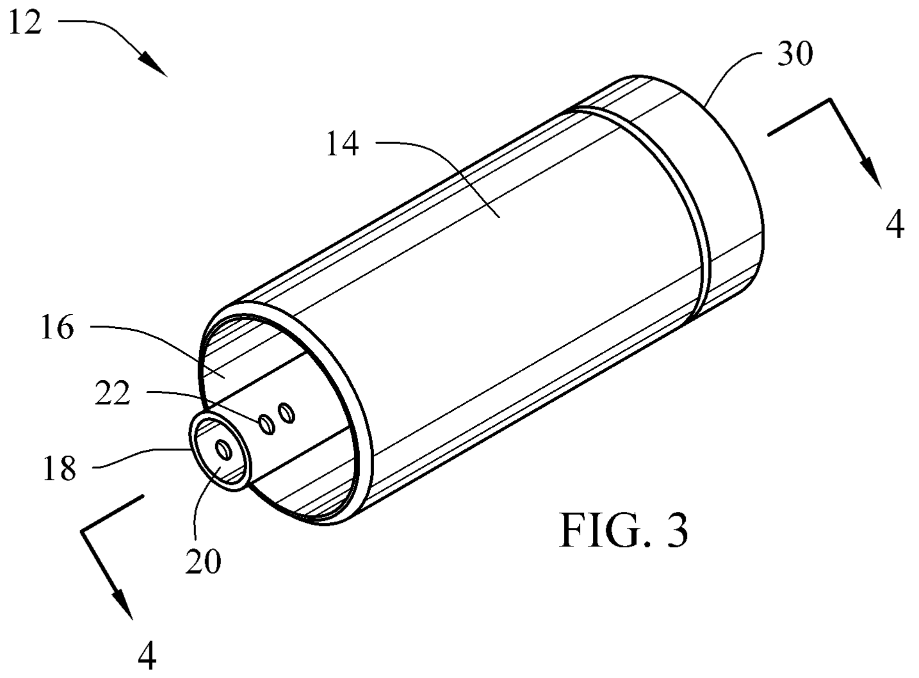
FIG. 3 is a perspective view of the handle unit of the doorjamb safety system of the present technology.
Figure 4:
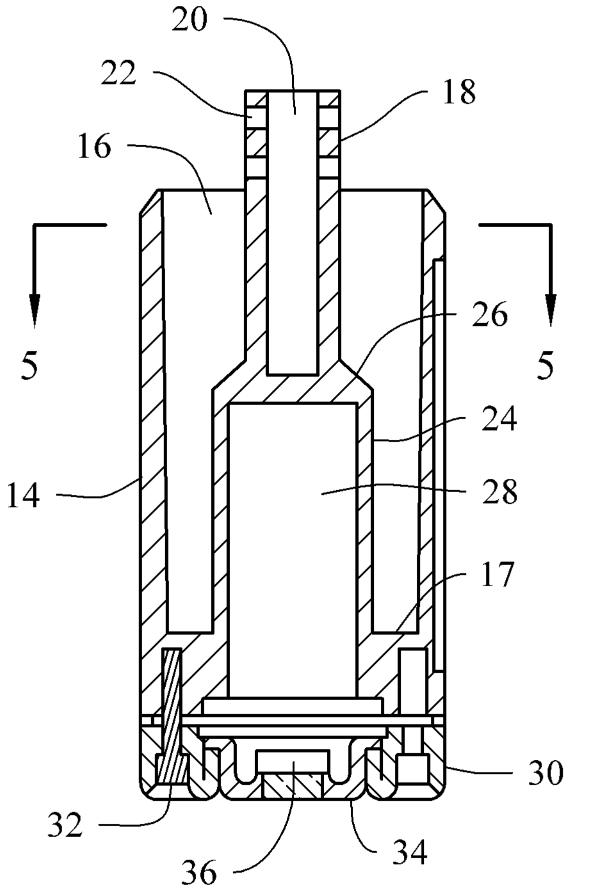
FIG. 4 is a cross-sectional view of the handle unit take along line 4-4 in FIG. 3.
Figure 5:
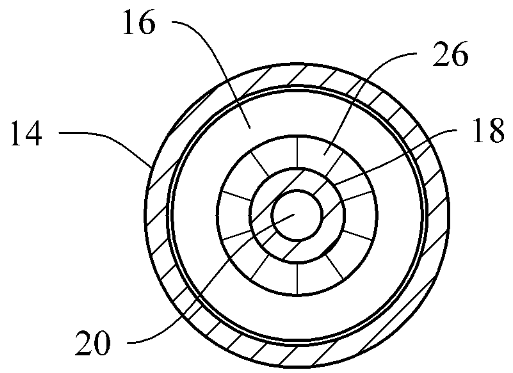
FIG. 5 is a cross-sectional view of the handle unit take along line 5-5 in FIG. 4.
Figure 6:
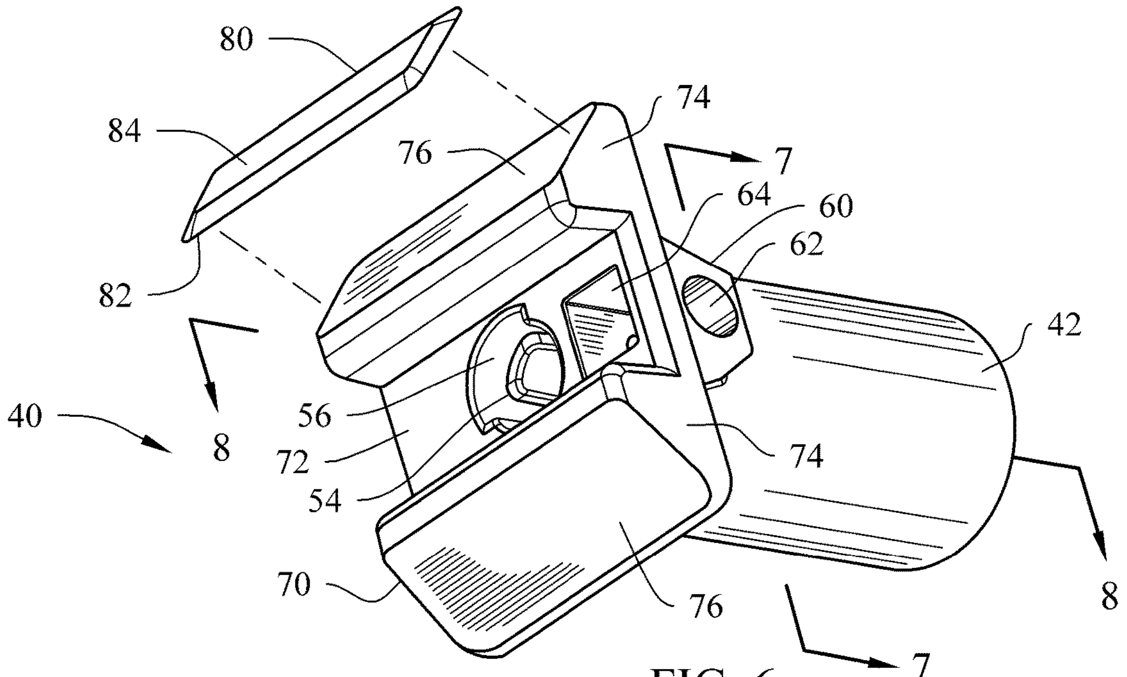
FIG. 6 is a perspective view of the wedge unit of the doorjamb safety system with the pad exploded.
Figure 7:
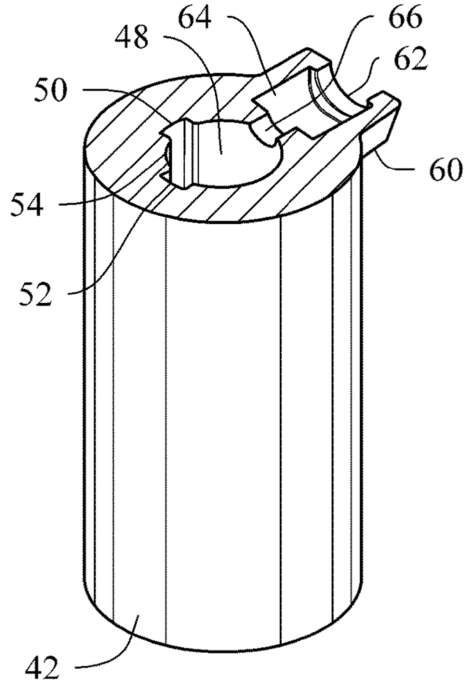
FIG. 7 is a cross-sectional perspective view of the wedge unit taken along line 7-7 in FIG. 6.
Figure 8:
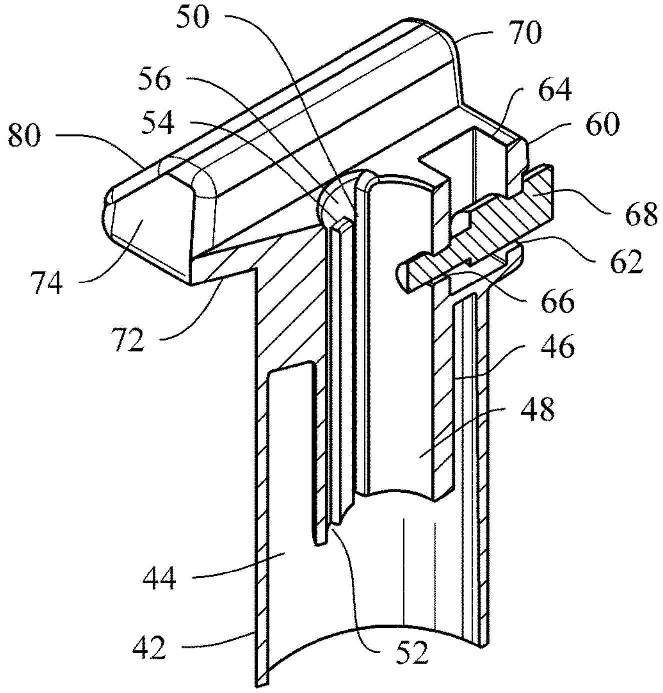
FIG. 8 is a cross-sectional perspective view of the wedge unit taken along line 8-8 in FIG. 6.
Figure 9:
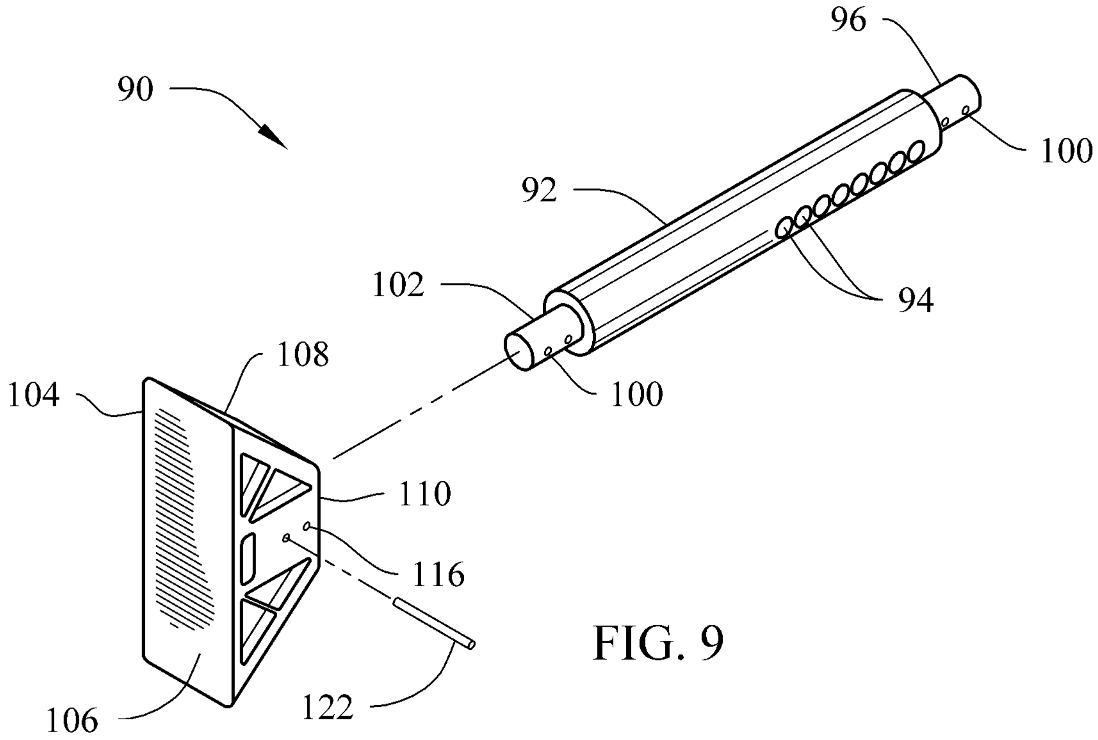
FIG. 9 is an exploded perspective view of the triangled chock unit of the doorjamb safety system.

As best illustrated in FIGS. 1-2, the handle unit 12 is shown slidably engaged over a body portion 42 of the wedge unit 40 which houses a spring (illustrated in FIGS. 11-12), and an elongate shaft 92 of the triangled chock unit 90 attached between a proximal end of handle unit 12 and a chock 104. It should be noted that chock 104 terminates the shaft 92, which is attached to the handle unit 12. The shaft 92 can include a plurality of openings or holes 94 that are for locking purposes when a locking button 68 is depressed into one of them once the unit 10 is engaged in a doorjamb.

Referring to FIGS. 1-5, the handle unit 12 can include a handle housing 14 featuring a hollow interior 16, where the handle housing 14 can be any configuration graspable by a user. An outer surface of the handle housing 14 can include padding, grips, texturing, etc. to assist in gripping the handle housing 14 by a user's hand. In some or all embodiments, an interior surface of the handle housing 14 that defines the hollow interior 16 can be tapered in a converging manner towards an end wall 17 that provides a closed end of the hollow interior 16.

A shaft-receiving member 18 can be concentrically located inside the hollow interior 16 featuring an open end in communication with a shaft-receiving cavity 20 and one or more bores 22 in communication with the shaft-receiving cavity 20. The open end can extend exterior of an open end of the handle housing 14. The cavity 20 can be along a longitudinal axis of the handle unit 12, and the bores 22 can be lateral to the longitudinal axis, with the bores 22 being located exterior of the handle housing 14.

A second member 24 can be concentrically located in the hollow interior 16 and can include a second cavity 28. The shaft-receiving member 18 can extend from an end of the second member 24. The second member 24 can have a width or diameter larger than the shaft-receiving member 18, thereby creating an angle, chamfered or curved transition section 26. Accordingly, an area of the hollow interior 16 adjacent the second member 24 can be less than an area adjacent the shaft-receiving member 18.

An end cap 30 can be attached to the handle housing 14 by threading or by fasteners 32 to close off an end of the handle housing 14 and/or the second cavity 28. An electronic device 36 can be included with the end cap 30 to provide additional safety or alerting functions. A battery can be associated with the electronic device 36 or can be received in the second cavity 28. The electronic device 36 can be any one or any combination of, but not limited to, a light, an audible device, a siren, a strobe light, a tethering line, a speaker, a microphone, a radio receiver, a two-way communication device, a transmitter, a transceiver, a location tracking device or any other similar device(s). It can be appreciated that the electronic device 36 can be a modular unit 34 attachable and interchangeable with the end cap 30. A flanges or stop edge of the end cap 30 can abut against a flange or lip of the modular unit 34, and where tightening of the end cap 30 against the end of the handle housing 14 could secure the electronic device 36 in place and/or in electrical contact with contacts utilized with a battery received in the second cavity 28.

It can be appreciated that the handle unit 12 can be accomplished without a separate end cap 30 and/or the electronic device 36. Further, the second cavity 28 can be utilized to store peripheral items such as, but not limited to, a tether line, a flashlight, medical supplies, a water container, etc.

It can further be appreciated that the handle unit 12 can include an infrared (IR) alarm motion detecting system (not shown). The IR alarm motion detecting system can be part of or utilized with the electronic device 36, and can activate an alarm, alert and/or indication when movement is detected. Further, a signal can be transmitted from the handle unit 12 to a remote device or system when movement is detected. This signal can further include location information for that particular handle unit 12 detecting movement. Further, the IR motion detecting system can activate an explosive device located in or associated with the handle unit 12. Further and/or in combination with any of the above, the handle unit 12 can include a laser activated explosive device (not shown), which could activate an explosive device located in or associated with the handle unit 12 when a body or object breaks the beam. These explosive device embodiments can be utilized for military or tactical purposes.

Referring to FIGS. 1, 2 and 6-8, the wedge unit 40 can include a body portion 42 slidably receivable in the hollow interior 16 of the handle housing 14. The body portion 42 can have a shape corresponding to the handle housing 14 and a width or diameter less than the handle housing 14. A hollow interior 44 is defined in the body portion 42 that is in communication with a first open end of the body portion 42. A shaft-receiving section 46 extends from a wedge end 70 into the hollow interior 44, with a shaft-receiving bore 48 being defined through the shaft-receiving section 46 along a longitudinal axis of the wedge unit 40.

The shaft-receiving bore 48 is configured to slidably received therethrough the shaft 92 of the triangled chock unit 90. A first longitudinal channel 50 and a second longitudinal channel 52 are defined in the shaft-receiving section 46, and which are both in communication with the shaft-receiving bore 48. A longitudinal ridge 54 extends into the shaft-receiving bore 48 to separate and define the first and second longitudinal channels 50, 52. The ridge 54 terminates prior to an end of the shaft-receiving bore 48 to define a transition opening 56 communicating between ends of the first and second longitudinal channels 50, 52. It can be appreciated that the first and second longitudinal channels 50, 52 and the transition opening 56 can act and/or be configured as a keyway.

A button housing 60 can extend out from a side of the body portion 42 for utilization with the button 68. A first bore 62 can be defined through the button housing 60 configured to slidably receive a first portion of the button 68, and a second bore 66 can be defined through the shaft-receiving section 46 configured to slidably receive a second portion of the button 68. Consequently, reciprocal movement of the button 68 while assembled in the button housing 60 provides a distal end of the second portion of the button 68 to be moved in the shaft-receiving bore 48 a predetermined distance. It can be appreciated that the button housing 60 can defined a button cavity 64 that can house a spring 69 configured to pull the button 68 toward the button housing 60 toward a default locked position or push the button 68 to a default unlocked position. The user could pull the button 68 away from the button housing 60 to retract it. Alternatively, the button 68 can have an extended cam under it that is held in the up position by way of a small pressure spring and locking pin. The first bore 62 can have a width or diameter larger than the second bore 66, accordingly the first portion of the button 68 can have a width or diameter larger than the second portion. The first bore 62 can be aligned with the second bore 66, and can be lateral to the longitudinal axis of the body portion 42.

The wedge end 70 can be provided at a second open end of the body portion 42 opposite to that of the first open end defining the hollow interior 44. The wedge end 70 can include a flat and/or planar end wall 72, and a pair of wedge sides 74 located on sides of the planar end wall opposite each other. The end wall 72 can extend lateral across an end of the body portion 42 opposite to that of the open end. The shaft-receiving bore 48 is defined through the planar end wall 72 to slidably receive at least a portion of the shaft 92.

Each of the wedge sides 74 can include a flat surface 76 provided at an angle/inclination in a direction toward each other. The wedge sides 74 can accordingly extend above or beyond a lateral width of the end wall 72 and/or above or beyond a longitudinal distance away from the end wall 72. The configuration of the wedge sides 74 can consequently create a notch defined by the end wall 72 and sidewalls of the wedge sides 74 that are perpendicular to the end wall 72.

A pad 80 can be attached to the flat surface 76 of each of the wedge sides 74. The pad 80 can be configured in a shape corresponding with the flat surface 76, and include edges that transition with edges or sides of the flat surface 76 and/or wedge sides 74 to create a smooth transition therebetween. The pad 80 can be made of a material softer than the wedge sides 74 to enhance a grip or friction force against a surface of the doorframe and/or door when in use. The material of the pad 80 can be, but not limited to, plastic, rubber, silicon, foam and the like, and can further include texturing or patterns to increase grip. Attachment of the pad 80 to the flat surface 76 can be accomplished by, but not limited to, adhesives, mechanical fasteners, mechanical interlocking components, magnets, hook and loop fasteners, tongue and groove, ratchets, tabs and the like.

Referring to FIGS. 1, 2, 9 and 10, the triangled chock unit 90 can include the shaft 92 and the chock 104. The shaft 92 can include a first end section 96 and a second end section 102. The first and second end sections 96, 102 can have a width or diameter less than the shaft 92, and can each include one or more bores 100 defined therethrough and lateral to a longitudinal axis of the shaft 92. It can be appreciated that the first and second end sections 96, 102 can be of the same width, diameter and/or shape, or can be different.

The shaft 92 can include a plurality of openings 94 defined therein or therethrough that are lateral to the longitudinal axis of the shaft 92. The openings 94 are each configured to receive the second portion of the button 68.

Figure 10:
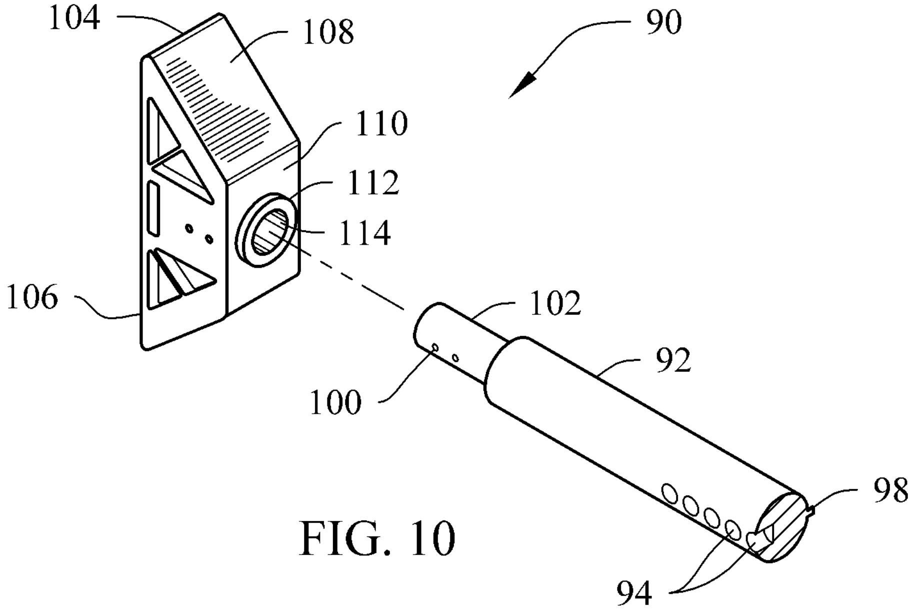
FIG. 10 is an exploded perspective view of the triangled chock unit of the doorjamb safety system.

A detent 98 laterally extends from a side of the shaft 92 opposite to that of the openings 94, as best illustrated in FIG. 10. The detent 98 is configured to be slidably received in and travel along the first and second longitudinal channels 50, 52 and/or the transition opening 56.

The first end section 96 or the second end section 102 can be configured to be received in the cavity 20.

The chock 104 can include a flat end side 106, a pair of tapering sides 108, and a connection end 110. The tapering sides 108 are angled in a converging manner from the end side 106 to the connection end 110, and can each include textures, patterns, grips, configurations to enhance contact with a variety of different doors, doorframes and/or building structures.

An extension 112 can extend from the connection end 110 and a cavity 114 can be defined through the extension 112 and into at least portion of the chock 104. The cavity 114 can be configured to receive the first end section 96 or the second end section 102 so that one or more bores 116 defined through chock 104 are alignable with the bores 100 of the first end section 96 or the second end section 102 assembled therewith. The bores 116 can be defined laterally to and in communication with the cavity 114. Mechanical fasteners 122 can be inserted in the bores 116, 100 and utilized to secure the chock 104 with the shaft 92. The fasteners 122 can be, but not limited to, rivets, screws, bolts, pins and the like. It can be appreciated that the chock 104 can be threadably attached to the first end section 96 or the second end section 102 by way of threading associated with the cavity 114 and the first end section 96 or the second end section 102, respectively.

Recesses, notches and/or through holes can be defined in the chock 104 to reduce its weight.

Figure 12:
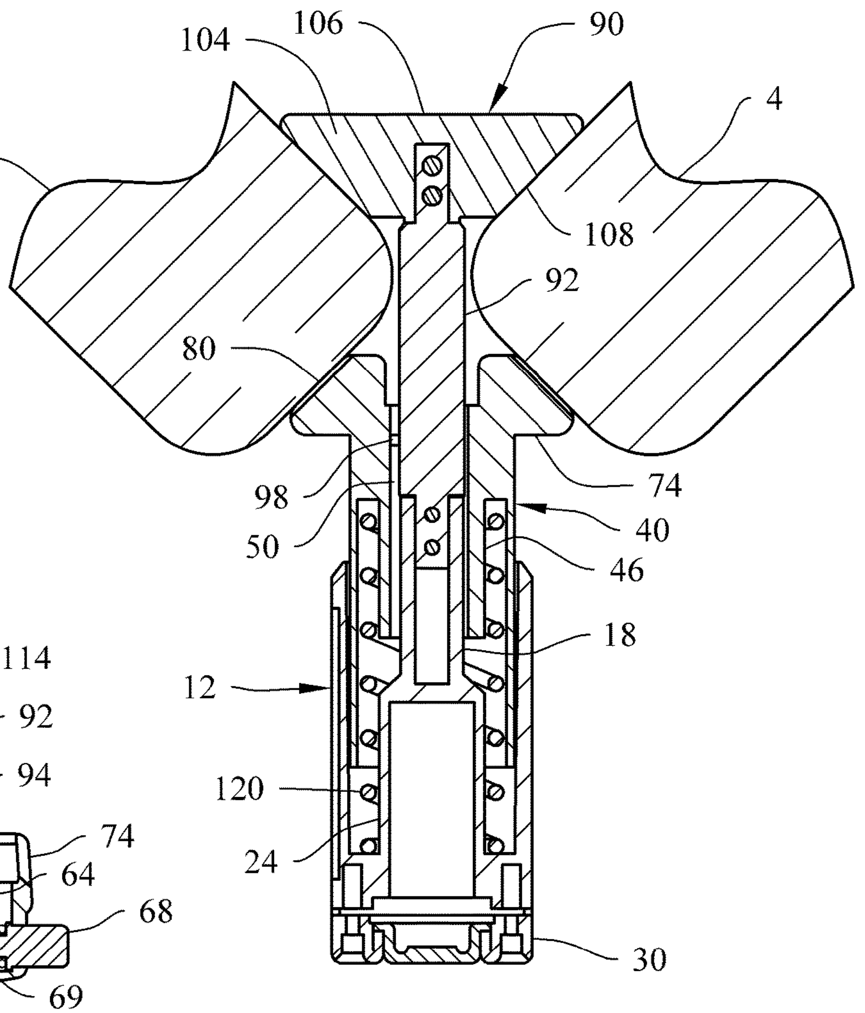
FIG. 12 is a cross-section view of the assembled doorjamb safety system taken along line 12-12 in FIG. 2 and in utilization with a doorjamb.
Figure 11:
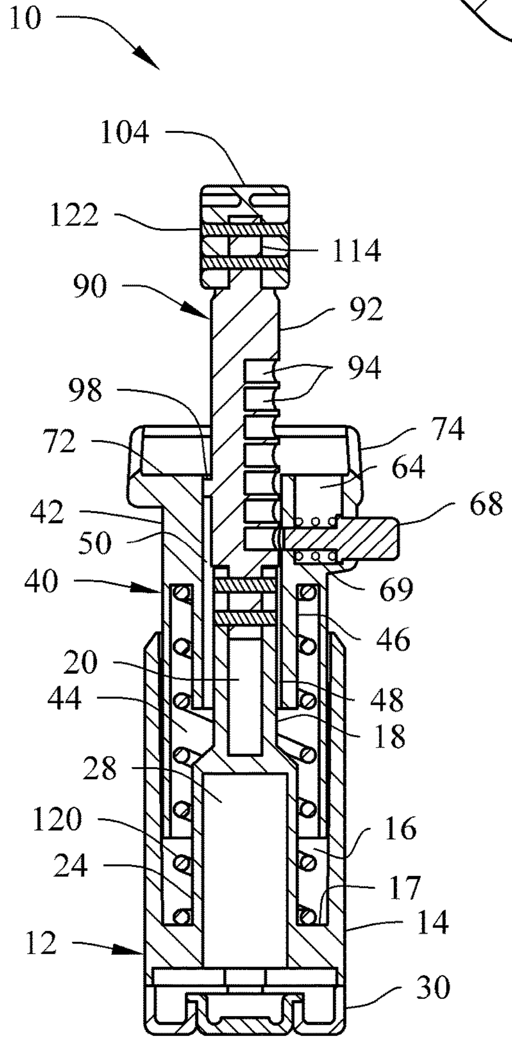
FIG. 11 is a cross-section view of the doorjamb safety system fully assembled taken along line 11-11 in FIG. 1.

FIGS. 11 and 12 best illustrates the handle unit 12, the wedge unit 40 and the triangled chock unit 90 assembled to form the doorjamb safety system 10. The first end section 96 or the second end section 102 of the shaft 92 can be inserted into the cavity 20 so that the bores 22 of the shaft-receiving member 18 and the bores 100 of the first or second end section 96, 102, respectively, are aligned. Fasteners, rivets or pins can then be utilizing with the bores 22, 100 to secure the shaft 92 to the handle housing 14 together.

A biasing element or spring 120 can be inserted into the hollow interior 16 of the handle housing 14 so that an end thereof contacts the end wall 17.

After which, the open end of the body portion 42 of the wedge unit 40 can be inserted into the hollow interior 16 of the handle housing 14 so that the shaft 92 is received through the shaft-receiving bore 48 and the spring 120 is located in the hollow interior 44 of the body portion 42 between the body portion and the shaft-receiving section 46. It can be appreciated that the button 68 should be in a retracted position so that the second portion of the button 68 does not contact or prevent travel of the shaft 92 through the shaft-receiving bore 48. It can be further appreciated that the shaft 92 should be orientated so that the detent 98 is received in either of the first or second channels 50, 52.

In this assembled configuration, movement of the handle unit 12 and the wedge unit 40 toward each other would compress the spring 120 and provide a biasing force thereagainst. Additionally, this movement would further bring the open end of the body portion 42 toward the end wall 17 and consequently contacting the converging interior side of the handle housing 14. It can be appreciated that further movement of the wedge unit 40 toward the handle unit 12 increases the frictional holding force of the tapered interior side of the handle housing 14 against the exterior side of the body portion 42. This friction force can be utilized to hold the handle unit 12 and the wedge unit 40 in a compressed configuration.

With the wedge unit 40 assembled with the handle unit 12, then the chock 104 can be assembled with the free end section 96, 102 of the shaft 92. This can be accomplished by placing the cavity 114 of the chock 104 to receive either the free end section 96, 102 of the shaft 92 so that the bores 116 of the chock 104 and the bores 100 of the free end section 96, 102 of the shaft 92 are aligned. Then fasteners or rivets 122 can be utilized to secure the two parts together.

In this assembled configuration, the tapered sides 108 of the chock 104 and the pad 80 or angle flat surfaces 76 face each other in a spaced apart relationship. The assembled doorjamb safety system 10 can then be inserted into an open doorjamb so that one of these spaced apart relationships is configured to receive a corner of a doorframe 2 and the other spaced apart relationship is configured to receive a corner of a door 4, as best illustrated in FIG. 12.

The handle unit 12 can then be pushed towards the wedge unit 40 so that the pads 80 contact their respective door frame 2 and door 4 surfaces, thereby squeezing two adjacent surfaces forming the corner of the door frame 2 between one of the tapered sides 108 and one of the pads 80, and squeezing two adjacent surfaces forming the corner of the door 4 between the other of the tapered sides 108 and the other of the pads 8.

When a suitable squeezing force is applied, the button 68 can be pressed so that the second end of the button 68 is received in one of the holes 94 of the shaft 92, thereby locking the doorjamb safety system 10 in an operation configuration that prevents the door 4 from pivoting to a closed position.

The first and second channels 50, 52 can be configured to provide the triangled chock unit 90 in two or more different rotational orientations. For example, a first rotational orientation can provide the chock 104 rotated 90 degrees with respect to the wedge sides 74 for insertion of the chock 104 through the doorjamb. In the exemplary, this first rotational orientation can include the detent 98 of the shaft 92 received in the first channel 50. The doorjamb safety system 10 can then be rotated so the tapered sides 108 are flush and in contact with their respective doorframe 2 and door 4 surfaces. After which, the wedge unit 40 can moved so that the detent 98 travels along the first channel 50 until it is capable of entering the transition opening 56. Then the wedge unit 40 can be rotated so that the detent 98 travels across the transition opening 56 where the detent 98 can then enter the second channel 52. This rotation of the wedge unit 40 places the doorjamb safety system 10 in a second rotational orientation with the pads 80 flush and in contact with their respective doorframe 2 and door 4 surfaces.

In response to pushing the handle unit 12 in the direction of the chock 104, spring 120 is compressed, which causes the shaft 92 terminating in the chock 104 to extend out from wedge end 70. As the handle unit 12 is rotated, the chock 104 rotates to a transverse position in relation to wedge end 70.

In the retracted position, the chock 104 driven by the handle unit 12 cannot rotate in relation to wedge end 70. The detent 98 on the shaft 92 is aligned with the first or second channel 50, 52, which allows full travel of the handle unit 12 over the body portion 42 of the wedge unit 40 compressing the spring 120. Upon extension, the detent 98 slides in the first channel 50, while the transition opening 86 allows rotation of the handle unit 12 and its attached shaft 92 with chock 104. Rotation of the handle unit 12, and thus the shaft 92, moves the detent 98 out of the way. Upon release of the handle unit 12, the detent 98 engages to set the wedge unit 40 in a locked position, which prevents re-extension of the chock 104 and locks out rotation. In this way, the wedge unit 40 is made secure so that any tension applied to the wedge unit 40 from a pulling force on the handle unit 12 does not compress the spring 120, nor allow rotation of the chock 104, maintaining a secure connection.

The handle unit 12, the wedge unit 40 and/or the triangled chock unit 90 can be made of any fire resistant material or thermally insulating material.

Figure 13:
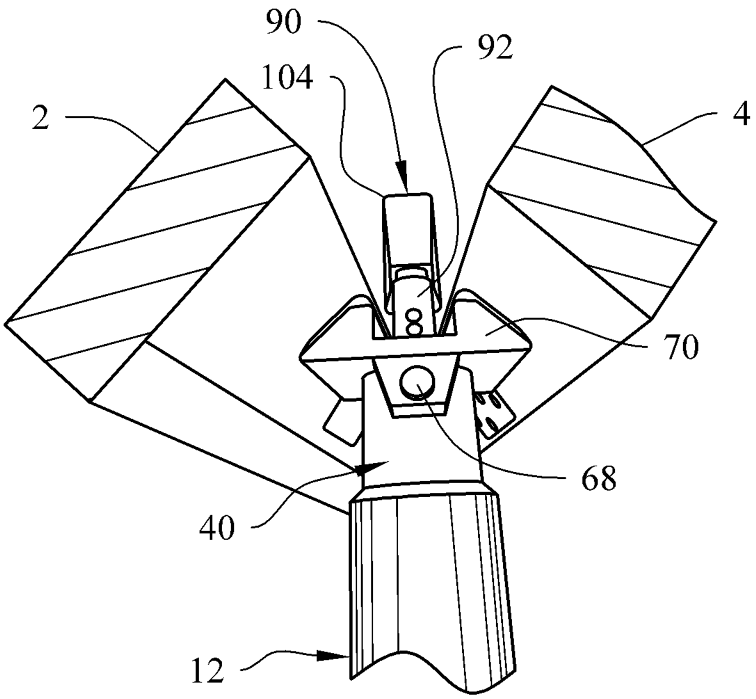
FIG. 13 is a top perspective view of the doorjamb safety system being inserted into a doorjamb with the triangled chock unit in an insertion configuration.
Figure 14:
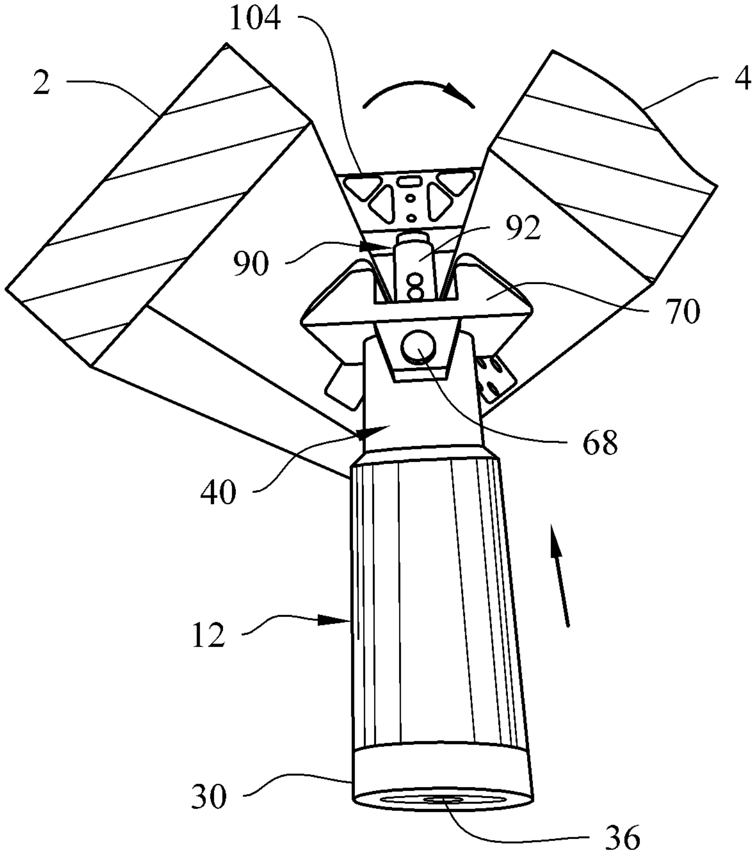
FIG. 14 is a top perspective view of the doorjamb safety system inserted in the doorjamb with the triangled chock unit rotated in an in-use configuration.

In an exemplary use and as best illustrated in FIGS. 13-14, it can now be understood that the doorjamb safety system 10 can be utilized to hold a door 4 open, even if the door 4 includes an automatic self-closing mechanism. Further, the angle of the flat surfaces 76 and the tapered sides 108 would result in an angle at which the door 4 is held open. With the door 4 opened to a 90 degree position, from waist height the user can push the doorjamb safety system 10 as far as it will go forward into the doorjamb area gap were the hinges are attached, the wedge end 70 of the wedge unit 40 will fill the gap making contact on both the door frame 2 and the edge of the door 4 on each side of the wedge end 70.

The triangled chock unit 90 in its normal position can slide through the gap to the backside of the doorframe 2 and door 4 by pushing the spring-loaded handle unit 12 forward into the doorframe gap. This pushing motion will extend the chock 104 out past the backside of the doorframe 2 and door 5. Then the user can turn the handle unit 12 90 degrees to the right, which will rotate the chock 104 90 degrees behind the door frame 2 and door 4 so the chock 104 is now in its locking position with the tapered sides 108 being perpendicular to the floor and the edges of the triangled wedge between the door frame 2 and the door 4 locking the unit 10 in place.

The door 4 may tend to close a minor amount due to the spring in the handle unit 12 giving to the pressure of the closing mechanism of the door 4 against the doorjamb safety system 10. One way to stop this from happening, the user could hold the door 4 in its full 90 degree or more open position, then press the lock button 68, and then wiggle the door 4 open a bit until the button 68 depresses into one of the holes 94 in the shaft 92. Then the user can hold the button 68 down and release the door 4, the door tension from trying to close will put tension on the button 68 and keep it from popping up and releasing the door 4.

With the doorjamb safety system 10 locked in the doorjamb, the door 4 is held in the open position until the user releases the button 68, rotates the chock 104 for removal out of the doorjamb. While in place, the user can activate the light 36 on the rear of the handle unit 12. This can be accomplished by rotating the end cap 30 until contacts are made between the end cap 30 and the handle housing 14 or by pressing/tapping a button on the end cap 30. For example, the user can tap once to illuminate a red light, twice for yellow or three times for a green blinking light. The different colored lights can be used to signal a danger threat for that room prior to entering, which can be utilized with first responders, firefighters or law enforcement officers. Pressing the button a fourth time could turn the light 36 off. In the alternative, if the light 36 stays a solid color without blinking, then this could signal that the battery has energy for a remaining predestined time, for example, 2 hours of charge/energy remaining.

It can be appreciated that the battery can be rechargeable utilizing a recharging port associated with the handle housing 14, the end cap 30 or the light 36. The light 36 can include printed circuit board or a controller unit configured or configurable to control operations of the light 36.

To remove the doorjamb safety system 10 from the doorjamb, the user can slightly push the door 4 open, thereby removing the pressure the button 68 wherein and it will release itself from the shaft hole 94 by the button spring that will pop it up out of the hole 94. After which, the user can reverse the above installation steps of it from the doorjamb. This can be accomplished by rotating the doorjamb safety system 10 so that the chock 104 is in line with the opened doorjamb. Then the user can simply pull the doorjamb safety system 10 away from the doorjamb, thereby retracting the rotated chock 104 out through the opened doorjamb.

While embodiments of the doorjamb safety system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although holding open an automatically closing door have been described, it should be appreciated that the doorjamb safety system and method herein described can also be suitable for clamping or anchoring a handled unit to a building structure, board, paneling or wall.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by LETTERS PATENT of the United States is as follows:

1. A doorjamb safety system comprising:

a handle unit comprising a handle housing defining a handle hollow interior, and a shaft-receiving member located inside the handle hollow interior;

a chock unit comprising a shaft and a chock located at a first end of the shaft, a second end of the shaft being attached to the shaft-receiving member allowing for the chock to rotate with the handle when the handle is rotated; and a wedge unit comprising a wedge end located at one end of a body portion, the body portion being slidably associated with the handle unit, the wedge end being configured to contact any one of or any combination of a door and a door frame;

wherein the chock is configured to contact any one of or any combination of the door and the door frame on a side opposite to that of the wedge end.

2. The doorjamb safety system according to claim 1, wherein the handle unit includes a second member concentrically located in the handle hollow interior, and the shaft-receiving member extends from an end of the second member;

wherein the body portion of the wedge unit defining a body hollow interior, and a shaft-receiving bore defined through the wedge end and in communication with the body hollow interior, the body portion being slidably receivable in the handle hollow interior; and wherein the shaft being slidably and rotatably associated with the shaft-receiving bore.

3. The doorjamb safety system according to claim 2, wherein the handle unit includes an electronic device associated in an end cap attachable to the handle housing, wherein the electronic device is any one of or any combination selected from the group consisting a light, an audible device, a radio receiver, a transmitter, a transceiver, and a tether.

4. The doorjamb safety system according to claim 2, wherein the handle unit includes a second member located in the handle hollow interior, the second member having a width or diameter greater than the shaft-receiving member, and where the shaft-receiving member extends from the second member with a free end of the shaft-receiving member being located exterior of the handle housing.

5. The doorjamb safety system according to claim 4, wherein the shaft-receiving member extends from the wedge end into the body hollow interior, the shaft-receiving member being configured to separate the shaft-receiving bore and the body hollow interior.

6. The doorjamb safety system according to claim 5 further comprising a spring configured to provide a biasing force against the wedge unit when the handle housing is moved towards the wedge unit.

7. The doorjamb safety system according to claim 6, wherein the spring is locatable in the body hollow interior between the body portion and the shaft-receiving member and the handle hollow interior between the handle housing and the second member.

8. The doorjamb safety system according to claim 5, wherein the handle housing includes an inner surface that defines the handle hollow interior, the inner surface convergingly tapers toward the second member to create a narrowed section of the handle hollow interior with respect to an open end of the handle housing.

9. The doorjamb safety system according to claim 8, wherein the narrowed section of the handle hollow interior is configured to press against a section of the body portion of the wedge unit at a predetermined insertion distance of the body portion inserting into the handle hollow interior.

10. The doorjamb safety system according to claim 5, wherein the wedge unit further includes a first channel and a second channel defined along a longitudinal axis of the wedge unit, the first and second channels being in communication with the shaft-receiving bore.

11. The doorjamb safety system according to claim 10, wherein a ridge extends into the shaft-receiving bore to separate and define the first and second channels, and to define a transition opening configured to provide communication between the first channel, the second channel and the shaft-receiving bore.

12. The doorjamb safety system according to claim 2, wherein the wedge unit includes angled wedge sides that convergingly taper toward each other in a direction away from the body portion.

13. The doorjamb safety system according to claim 12, wherein the angled wedge sides are spaced apart from each other to form an opening configured to receive at least a portion of the chock therebetween.

14. The doorjamb safety system according to claim 12 further comprising at least one pad attachable to each of the angled wedge sides.

15. The doorjamb safety system according to claim 14, wherein the chock includes angled chock sides that are spaced apart from each other and are angled toward each other in a direction toward the shaft of the chock.

16. The doorjamb safety system according to claim 15, wherein a first pair of the angled wedge sides and the angled chock sides is configured to receive a corner of the door frame therebetween, and a second pair of the angled wedge sides and the angled chock sides is configured to receive a corner of the door therebetween.

17. The doorjamb safety system according to claim 16, wherein a spring is configured to push the wedge unit toward the door frame and the door so the angled wedge sides contact the door frame and the door respectively, pull the chock unit toward the door frame and the door so the angled chock sides contacts the door frame and the door, respectively, or push the wedge unit and pull the chock unit toward the door frame and the door, respectively.

18. The doorjamb safety system according to claim 2 further comprising a lock button moveably associated with the wedge unit, and wherein the shaft includes a plurality of openings defined therein or therethrough that are lateral to a longitudinal axis of the shaft, and where the openings are each configured to receive a portion of the lock button.

19. The doorjamb safety system according to claim 18, wherein the lock button being configured to be receivable in a hole defined in the shaft, and wherein the wedge unit includes a button spring configured to act on a portion of the lock button, and wherein the wedge unit includes a button housing extending from the body portion, the button housing defining a button hollow interior configured to receive the button spring, wherein the button housing defines a first button bore configured to slidably receive a first portion of the lock button, and the body portion defines a second button bore configured to slidably receive a second portion of the lock button, where the first portion of the lock button has a width or diameter greater than the second portion.

* * * * *